United States Patent [19]
Masubuchi et al.

[11] Patent Number: 5,321,239
[45] Date of Patent: Jun. 14, 1994

[54] CARD PROCESSING METHOD

[75] Inventors: Fumihito Masubuchi; Yoshihiko Hotta, both of Mishima; Kunichika Morohoshi, Numazu; Makoto Kawaguchi; Yukio Konagaya, both of Sunto; Toru Nogiwa; Nobuo Yamada, both of Numazu, all of Japan

[73] Assignee: Ricoh Company, Ltd., Tokyo, Japan

[21] Appl. No.: 925,659

[22] Filed: Aug. 7, 1992

[30] Foreign Application Priority Data

Aug. 7, 1991 [JP] Japan .................. 3-222301
Aug. 5, 1992 [JP] Japan .................. 4-229183

[51] Int. Cl.$^5$ ............................. G06K 19/02
[52] U.S. Cl. ......................... 235/380; 235/487
[58] Field of Search ........... 235/487, 380, 449, 384, 235/439; 283/85, 87, 904, 432

[56] References Cited

U.S. PATENT DOCUMENTS 5,055,662 10/1991 Hasegawa ..................... 235/492
5,117,415  5/1992 Ohta et al. ..................... 235/486

FOREIGN PATENT DOCUMENTS 4060891 2/1992 Japan .
2220776 1/1990 United Kingdom .

OTHER PUBLICATIONS

"Credit Card with an Erasable Field For Human Readability" IBM Technical Disclosure Bulletin, vol. 8 No. 11 Apr. 1966.

*Primary Examiner*—Donald Hajec
*Assistant Examiner*—Jhihan Clark
*Attorney, Agent, or Firm*—Oblon, Spivak, McClelland, Maier & Neustadt

[57] ABSTRACT

A card processing method of recording information or displaying, rewriting or erasing recorded information in a card having a magnetic recording portion, and a rewritable display portion which employs a reversible thermosensitive recording material, in which the step (a) of reading recorded information in the magnetic recording portion and the step (b) of rewriting the recorded information in the magnetic recording portion are carried out prior to the step (c) of erasing recorded information from the rewritable display portion and the step (d) of writing information in the rewritable display portion.

4 Claims, 1 Drawing Sheet

CARD PROCESSING METHOD

BACKGROUND OF THE INVENTION

1. Field of the Invention

The present invention relates to a card processing method and more particularly to a method for processing an information recording card such as a prepaid card or credit card comprising a magnetic recording portion and a rewritable display portion comprising a reversible thermosensitive recording material, which display portion is capable of repeatedly recording information in a visible manner to display recorded information and erasing recorded information therefrom.

2. Discussion of Background

A variety of cards such as a prepaid card and a credit card have appeared on the market and are used in many fields. Such cards have a rewritable recording portion based on the magnetic recording. At the beginning these cards did not have the function of displaying recorded information in a visible manner, for instance, the balance in the case of a prepaid card. Recently a card having a display portion of overwrite-type which comprises a thermosensitive recording material is being developed. Furthermore, attention has been paid to an information recording card comprising a display portion of a rewritable-type.

In order to provide the above-mentioned rewritable display portion in the card, as is known, a reversible thermosensitive recording material is most effectively used. The conventionally known reversible thermosensitive recording materials comprise a support and a reversible thermosensitive recording layer formed thereon, which comprises a matrix resin such as polyester and an organic low-molecular-weight material such as a higher alcohol or higher fatty acid dispersed in the resin, as disclosed in Japanese Laid-Open Patent Applications 54-119377 and 55-154198.

In the above-mentioned reversible thermosensitive recording materials, recording and erasure of information, that is, the formation and erasure of an image is achieved by utilizing the properties that the transparency of the reversible thermosensitive recording layer of the recording material varies with the temperature thereof. Likewise the conventional thermosensitive recording material of unreversible type, images can be formed in the reversible thermosensitive recording material by use of a thermal head or hot stamp, and moreover, images thus formed in the recording material can be erased therefrom with the application of heat thereto.

As disclosed in Japanese Laid-Open Patent Application 1-181766, a card which comprises both a magnetic recording material and a reversible thermosensitive recording material is proposed. In this kind of card, the reversible thermosensitive recording material is used for a rewritable display portion of the card; and the magnetic recording material, for a recording portion of the card. The following four steps are carried out in processing this kind of card:

Step (a): reading recorded information in the magnetic recording portion

Step (b): rewriting the recorded information in the magnetic recording portion

Step (c): erasing recorded information from the rewritable display portion

Step (d): writing information in the rewritable display portion

In a card processing apparatus designed to process a card comprising a magnetic recording portion and a display portion of an overwrite-type, for instance, used in an automatic ticket gate, first of all, the magnetic reading and writing operations in the magnetic recording portion represented by the above-mentioned steps (a) and (b) are conventionally carried out. According to the case, the step (a) may be further added to the above-mentioned sequence of (a) to (b) for verification. After the completion of magnetic reading and writing operations in the magnetic recording portion, the step (d) of writing information in the overwrite-type display portion is carried out. On the other hand, in the card processing apparatus for a card equipped with a rewritable display portion, the step (c) of erasing recorded information from the display portion is merely designed to be performed just before the step (d) of writing information in the rewritable display portion, as disclosed in Japanese Laid-Open Patent Application 3-10394. Namely, the four steps are carried out in the order of (a)–(b)–(c)–(d) conventionally.

As compared with other recording methods such as magnetic recording, however, the thermosensitive recording method has the drawback that it takes more time to write information in a thermosensitive recording material. In addition, to erase information from a reversible thermosensitive recording material requires still more time. As a matter of course, the time required to completely process the card in the card processing apparatus is increased. The shorter the time required to process the card, the more convenient for the user of a card. In addition, it becomes difficult to use the conventional card comprising the magnetic recording material and the reversible thermosensitive recording material, for example, in the card processing apparatus for an automatic ticket gate because such apparatus needs rapid card processing speed.

Furthermore, when a printing layer or thermosensitive display layer is overlaid on the magnetic recording layer in the information recording card for the purpose of effectively utilizing the entire surface of the card, the distance between the magnetic recording layer and a magnetic head is substantially increased. As a result, the reliability in reading and rewriting the recorded information in the magnetic recording portion is decreased.

SUMMARY OF THE INVENTION

It is therefore an object of the present invention to provide a card processing method capable of speedily reading recorded information, writing (rewriting) the recorded information and erasing recorded information with high reliability in a card which comprises a rewritable magnetic recording portion capable of recording invisible information, and a rewritable display portion which comprises a reversible thermosensitive recording material.

This object of the present invention can be achieved by a card processing method of recording information or displaying, rewriting or erasing recorded information in a card comprising (i) a magnetic recording portion capable of recording information therein, rewriting recorded information, or reading recorded information therefrom, and (ii) a rewritable display portion comprising a reversible thermosensitive recording material, capable of recording information in a visible manner to display recorded information and erasing recorded information therefrom, in which the steps (a) reading recorded information in the magnetic recording portion, (b) rewriting the recorded information in the magnetic recording portion, (c) erasing recorded information from the rewritable display portion, and (d) writing information in the rewritable display portion can be carried out, at least the above-mentioned steps (a) and (c) being carried out before the above-mentioned steps (b) and (d) are carried out. Specifically, in the card processing method of the present invention, the four steps are carried out in the order of (a)-(c)-(b)-(d), (a)-(c)-(d)-(b), (c)-(a)-(b)-(d), or (c)-(a)-(d)-(b).

Furthermore, it is preferable to carry out the step (a) or (b) immediately after the step (c). Namely, the step order of (a)-(c)-(b)-(d), (c)-(a)-(b)-(d), or (c)-(a)-(d)-(b) is preferable.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The decrease of reliability in the reading and writing operations in a recording portion of the card, which is the drawback in the conventional card processing method, can be prevented by not only using a magnetic recording material for the recording portion, but also carrying out the previously mentioned step (a) of reading recorded information or step (b) of writing recorded information in the magnetic recording portion immediately after the step (c) of erasing recorded information from the thermosensitive display portion.

When a card is heated for erasing recorded information from the thermosensitive display portion, a resin contained in the surface layer of the card is instantaneously softened by the application of heat thereto, so that the elasticity and flexibility of the resin is increased. When the magnetic head for reading recorded information is allowed to pass over the surface of the card while the above-mentioned resin is softened, the resin is easily deformed with the pressure applied by the magnetic head and the resin instantaneously becomes slightly thin. Therefore, the distance between the magnetic head and the magnetic recording layer of the card is decreased, thereby increasing the reliability of reading operation in the magnetic recording portion as compared with the case where the temperature of the surface layer of the card is low. With the above point taken into consideration, it is preferable in the card processing method of the present invention that the four steps be carried out in the order of (c)-(a)-(b)-(d) or (c)-(a)-(d)-(b).

In addition, to improve the card processing speed, the step (c), the operation of erasing recorded information from the display portion, may be carried out in parallel with processing of information obtained by the step (a).

Among the previously mentioned four steps for processing the card, rewriting the recorded information in the magnetic recording portion (step (b)) and writing information in the display portion (step (d)) necessitates the information obtained by the step (a) of reading recorded information in the magnetic recording portion. From the step (a) to the step (b) or from the step (a) to the step (d), therefore, the time to process the information obtained by the step (a) is required more or less. This kind of information processing time varies depending on the utilization field of the card. For example, in the case where the information is read and displayed as it is, the processing time is of the order of several micro seconds. When personal data is inquired from a host computer, on the other hand, it takes several seconds or several tens of seconds. When such information processing time is increased, it is a waste of time for the mechanism in the card processing apparatus because nothing is done during information processing.

To solve the above-mentioned problem, it is preferable to carry out the step (c), erasing recorded information from the display portion, between the steps (a) and (b) or between the steps (a) and (d). Namely, the step order of (a)-(c)-(b)-(d) or (a)-(c)-(d)-(b) is preferable in the card processing method of the present invention. This is because the step (c) can be carried out independently of the information read in the magnetic recording portion by the step (a), so that the step (c) can be freely performed regardless of the processing order so long as it is performed prior to the step (d) of writing information in the display portion, In the case where the information processing time of the card is long, the total card processing time can be most effectively decreased by carrying out the step (c) in parallel with information processing.

When the information processing time is not so long, there is no point in performing the erasing operation of step (c) in parallel with the information processing. In this case, it is desirable to carry out the step (c) while the user puts a card into the card processing apparatus and the user recognizes the card to be inserted in the apparatus. Thus, the entire processing time of the card can be curtailed. Namely, it is preferable to carry out the four steps in such an order of (c)-(a)-(b)-(d) or (c)-(a)-(d)-(b) in the card processing method of the present invention. In this case, when the card processing apparatus is designed in such a fashion that a part of the card is out of the processing apparatus in the course of the step (c), the owner of the card which is supplied for the processing can be identified. When the steps are carried out in the order of (c)-(a)-(b)-(d) in the present invention, it is preferable that a part of the card be out of the card processing apparatus in the course of the steps (c) and (d) for the same reason as stated above.

According to the card processing method of the present invention, as explained above, the card processing speed can be improved by changing the order of the step (c) from after the step (b), as conventionally disclosed, to before the step (b). After the completion of the steps (a) and (c), the steps (b) and (d) are performed according to the present invention.

While the card is dropped into the card processing apparatus and returned to the user's hand, the previously mentioned four steps are carried out in the apparatus. There are some ways in the order of four steps although some restrictions exist, for example, the reading operation in the magnetic recording portion (step (a)) is required to be performed prior to the rewriting operation in the magnetic recording portion (step (b)). According to the card processing method of the present invention, four steps are carried out in the best order, and therefore, the time when the card is in the card processing apparatus can be most effectively curtailed and the decrease of reliability in the reading operation in the magnetic recording portion can be prevented.

According to the occasion, a step of verifying the information rewritten in the magnetic recording portion may be performed after the step (b) of rewriting operation in the magnetic recording portion. This verifying step is regarded as included in the rewriting step (b) in the present invention. In addition, in the case where a card is equipped with not only a rewritable display portion, but also a display portion of the overwrite-type, it is preferable to carry out a step of writing information in the overwrite-type display portion simultaneously with the previously mentioned step (d) of writing information in the rewritable display portion. Alternatively, the writing step in the overwrite-type display portion ma be carried out just before or immediately after the writing step (d) in the rewritable display portion.

A card processing apparatus for effecting the card processing method according to the present invention may be designed to perform the previously mentioned four steps of: (a) reading recorded information in the magnetic recording portion, (b) rewriting the recorded information in the magnetic recording portion, (c) erasing recorded information from the rewritable display portion, and (d) writing information in the rewritable display portion, and the layout of the respective means for carrying out the above four steps is not specifically limited. Such card processing apparatus is roughly classified into two groups. One is designed in such a configuration that a card is inserted in one slot and discharged from another slot. This type of card processing apparatus is mainly used for an automatic ticket gate. The other is designed to have one slot through which a card is inserted into the apparatus and discharged from the same. For example, this type is used as an automatic ticket vending apparatus. The former has the advantages that the degree of freedom in the layout of the respective means for the steps (a), (b), (c) and (d) is high and high-speed processing can be achieved. However, the size of apparatus becomes large. In contrast to this, the latter can be made compact although it is difficult to increase the speed of information processing and the degree of freedom in the layout is restricted.

The card for use in the present invention comprises a support; a magnetic recording layer, formed on the support, which comprises a magnetic recording material; a light reflection layer or colored layer which is formed on the magnetic recording layer or on the back side of the support, opposite to the magnetic recording layer; and a display layer, formed on the light reflection layer or colored layer, which comprises a reversible thermosensitive recording material. Alternatively, instead of the display layer, a display portion may be provided by partially putting the reversible thermosensitive recording material on the light reflection layer or colored layer. Furthermore, a protective layer may be preferably formed on the display layer (or display portion). In the case where the light reflection layer (or colored layer) and the display layer are not formed on the magnetic recording layer, but formed on the back side of the support, a silver concealing layer or printing layer is formed on the magnetic recording layer.

In addition, not only the magnetic recording system, but also bar code, calra code, and other recording methods for use in OCR, an IC card and a laser card can be applied to the recording layer of the card for use in the present invention.

The reversible thermosensitive recording material for use in the display layer (or display portion) of the card is a material capable of reversibly making a change in a visible manner depending on the temperature thereof. Generally, the above-mentioned visible change is in tone or shape of the material. The reversible thermosensitive recording material for use in the present invention is capable of reversibly changing the tone thereof based on the combination of changes in the transmittance, reflectance, absorbed wavelength and degree of light scattering of the material. More specifically, this kind of reversible thermosensitive recording material is roughly classified into the following two groups:

(1) a material capable of reversibly assuming a transparent state and a white opaque state.

(2) a material in which a dye is capable of reversibly changing the tone thereof.

The above group (1) is, for instance, prepared by dispersing an organic low-molecular-weight material such as a higher alcohol or a higher fatty acid in a matrix resin such as polyester as previously mentioned. Representative examples of the group (2) are leuco-based thermosensitive recording materials with improved reversibility as disclosed in Japanese Laid-Open Patent Applications 1-88293 and 1-88294. In the information recording card for use in the present invention, the reversible thermosensitive recording material of group (1) is effectively employed.

To write information in the display portion of the card which comprises the above-mentioned reversible thermosensitive recording material, the same methods as used in the conventional thermosensitive recording materials without reversibility can be employed. For example:

(A) An electrically heated writing element such as a thermal head or hot stamp is caused to come into contact with the reversible thermosensitive recording material.

(B) Light with strong intensity such as a laser beam is applied to the reversible thermosensitive recording material to heat the same.

(C) Light with strong intensity is applied to an original so as to increase the temperature of a dark color portion in the original, and the original is then brought into contact with a support or a protective layer of the reversible thermosensitive recording material by the thermal transfer method.

To erase information from the display portion of the card, the same thermal head or hot stamp as used in writing information is usable. This method has the advantage that only an area intended to be erased can be erased. In particular, when the thermal head is used for the erasing operation in the display portion, one thermal head can serve in both the writing operation and the erasing operation.

To erase the information from the entire surface of the display layer, a temperature-controlled heating element with a large area, such as a heat roller or hot plate may be used. This method is superior in erasing speed.

Besides the above-mentioned erasing methods, the methods of heating the reversible thermosensitive recording material by the application thereto of an electromagnetic wave such as infrared rays and the application of temperature-controlled fluid such as warm air can be employed in the present invention. These methods are effective to simultaneously erase all information formed on a plurality of cards.

In the present invention, the card is required to be uniformly heated in the erasing operation of the thermosensitive display portion, so that a heating means with a large area such as the above-mentioned heat roller or hot plate is most preferable. In the case where the thermal head is employed in the erasing operation in the present invention, therefore, it is necessary to adjust the thermal head to work in such a fashion that at least an area of the reversible thermosensitive recording material, which overlaps the magnetic recording portion is entirely heated. In addition, consideration must be given to the pulse application method so as not to heat the display layer (or display portion) in the unit of a dot; otherwise the magnetic recording layer is partially heated and the reliability of the reading and writing operations in the magnetic recording layer is decreased.

The reversible thermosensitive recording material for use in the display layer (or display portion) of the card can be switched from a transparent state to a milky white opaque state, and vice versa, depending on the temperature thereof. The difference between the transparent state and the milky white opaque state of the recording material is considered to be based on the following principle:

(i) In the transparent state, the organic low-molecular-weight material dispersed in the matrix resin consists of relatively large crystals, so that the light which enters the crystals from one side passes therethrough to the opposite side, without being scattered, thus the reversible thermosensitive recording material appears transparent.

(ii) In the milky white opaque state, the organic low-molecular-weight material is composed of polycrystals consisting of numerous small crystals, with the crystallographic axes pointed to various directions, so that the light which enters the recording material is scattered a number of times at the interfaces of the crystals of the low-molecular-weight material. As a result, the reversible thermosensitive recording material becomes opaque in a milky white color.

The transition of the state of the reversible thermosensitive recording material depending on the temperature thereof will now be explained by referring to FIG. 1.

Figure 1:
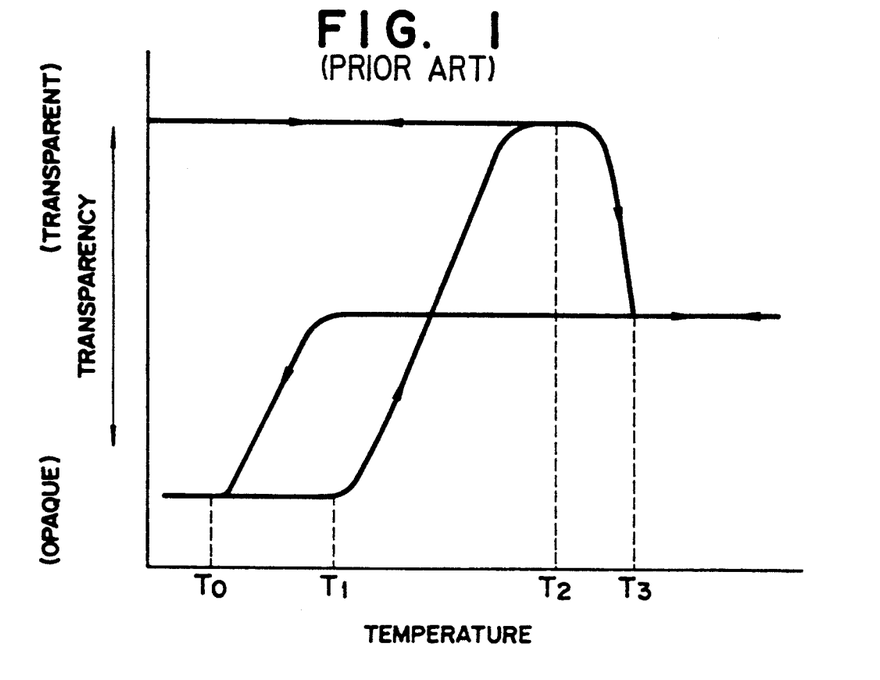
FIG. 1 is a diagram in explanation of the principle of formation and erasure of images in a reversible thermosensitive recording material for use in the present invention.

In FIG. 1, it is supposed that the reversible thermosensitive recording material comprising a matrix resin and a low-molecular-weight material dispersed in the matrix resin is initially in a milky white opaque state at room temperature $T_0$ or below. When the recording material is heated to temperature $T_2$, the recording material becomes transparent. Thus, the recording material reaches a maximum transparent state at temperature $T_2$. Even if the recording material which is already in the maximum transparent state is cooled to room temperature $T_0$ or below, the maximum transparent state is maintained. It is considered that this is because the organic low-molecular-weight material changes its state from a polycrystalline state to a single crystalline state via a semi-melted state during the above-mentioned heating and cooling steps.

When the recording material in the maximum transparent state is further heated to temperature $T_3$ or more, it assumes a medium state which is between the maximum transparent state and the maximum milky white opaque state. When the recording material in the medium state at temperature $T_3$ or more is cooled to room temperature $T_0$ or below, the recording material returns to the original maximum opaque state, without passing through any transparent state. It is considered that this is because the organic low-molecular-weight material is melted when heated to temperature $T_3$ or above, and the polycrystals of the organic low-molecular-weight material grow and separate out when it is cooled. If the recording material in the milky white opaque state is heated to any temperature between temperature $T_1$ and temperature $T_2$, and then cooled to the room temperature $T_0$ or below, the recording material assumes an intermediate state between the transparent state and the milky white opaque state.

When the recording material in the transparent state at room temperature $T_0$ is again heated to temperature $T_3$ or above, and then cooled to room temperature $T_0$, the recording material returns to the milky white opaque state. Thus, the reversible thermosensitive recording material for use in the display layer of the card can assume a maximum milky white opaque state, a maximum transparent state and an intermediate state between the aforementioned two states at room temperature.

Therefore, a milky white opaque image can be obtained on a transparent background, or a transparent image can also be obtained on a milky white opaque background by selectively applying the thermal energy to the reversible thermosensitive recording material in the display layer of the card. Further, such image formation and erasure can be repeated many times.

To form the display layer comprising the aforementioned reversible thermosensitive recording material, (1) a solution in which both the matrix resin and the organic low-molecular-weight material are dissolved, or (2) a dispersion prepared by dispersing the finely-divided particles of the organic low-molecular-weight material in a matrix resin solution may be coated, for example, on the magnetic recording layer directly, or preferably, on the light reflection layer, and then dried, so that a display layer can be formed. The aforementioned matrix resin dispersion of the low-molecular-weight material (2) employs a solvent in which at least one of the low-molecular-weight materials cannot be dissolved.

The solvent used for the formation of the display layer or the preparation of the reversible thermosensitive recording material can be selected depending on the kind of the matrix resin and the type of the organic low-molecular-weight material to be employed. For example, the solvents such as tetrahydrofuran, methyl ethyl ketone, methyl isobutyl ketone, chloroform, carbon tetrachloride, ethanol, toluene and benzene can be employed. Not only when a matrix resin dispersion (2) is used, but also when a matrix resin solution (1) is used, the organic low-molecular-weight material separates out in the form of finely-divided particles in the matrix resin in the obtained display layer.

The matrix resin for use in the display layer (or display portion) retains a layer in which the finely-divided particles of the low-molecular-weight material are uniformly dispersed and has a serious effect on the transparency of the display layer when the recording material assumes a maximum transparent state. Therefore, the resin with excellent film-forming properties, high transparency and high mechanical stability is preferably used as the matrix resin.

Examples of such resins include polyvinyl chloride; vinyl chloride copolymers such as vinyl chloride—vinyl acetate copolymer, vinyl chloride—vinyl acetate—vinyl alcohol copolymer, vinyl chloride—vinyl acetate—maleic acid copolymer and vinyl chloride—vinyl acrylate copolymer; polyvinylidene chloride; vinylidene chloride copolymers such as vinylidene chloride—vinyl chloride copolymer and vinylidene chloride—acrylonitrile copolymer; polyester; polyamide; polyacrylate, polymethacrylate or acrylate—methacrylate copolymer; and silicone resin. These resins can be used alone or in combination.

The organic low-molecular-weight material for use in the reversible thermosensitive recording material may be appropriately selected from the materials which are changeable from the polycrystalline state to the single crystalline state in accordance with each of the desired temperatures ranging from $T_0$ to $T_3$ as shown in FIG. 1. It is preferable that the organic low-molecular-weight material for use in the present invention have a melting point ranging from 30° to 200° C., more preferably from about 50° to 150° C.

Examples of the organic low-molecular-weight material for use in the present invention are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated monocarboxylic acids, or saturated or unsaturated dicarboxylic acids, and esters, amides and ammonium salts thereof; saturated or unsaturated halogenated fatty acids; and esters, amides and ammonium salts thereof; arylcarboxylic acids, and esters, amides and ammonium salts thereof; halogenated arylcarboxylic acids, and esters, amides and ammonium salts thereof; thioalcohols; thiocarboxylic acids, and esters, amides and ammonium salts thereof; and carboxylic acid esters of thioalcohol. These materials can be used alone or in combination.

It is preferable that the number of carbon atoms of the above-mentioned organic low-molecular-weight material be in the range of 10 to 60, more preferably in the range of 10 to 38, further preferably in the range of 10 to 30. Part of the alcohol groups in the esters may be saturated or unsaturated, and further may be substituted by halogen. In any case, it is preferable that the organic low-molecular-weight material have at least one atom selected from the organic low-molecular-weight materials comprise, for instance, —OH, —COOH, —CONH—, —COOR, —NH—, —NH$_2$, —S—, —S—S—, —O— or a halogen atom.

Specific examples of the above-mentioned organic low-molecular-weight materials include higher fatty acids such as lauric acid, dodecanoic acid, myristic acid, pentadecanoic acid, palmitic acid, stearic acid, behenic acid, nonadecanoic acid, arachic acid and oleic acid; esters of higher fatty acids such as methyl stearate, tetradecyl stearate, octadecyl stearate, octadecyl laurate, tetradecyl palmitate and dodecyl behenate; and the following ethers or thioethers:

and

Of these, higher fatty acids having 16 or more carbon atoms, more preferably having 16 to 24 carbon atoms, such as palmitic acid, lignoceric acid, stearic acid and behenic acid are preferred in the present invention.

Furthermore, to widen the temperature region in which the recording material assumes a transparent state, proper organic low-molecular-weight materials are selected from the previously-mentioned materials and used in combination. Alternatively, the organic low-molecular weight material may be used together with other materials with a different melting point as disclosed in Japanese Laid-Open Patent Applications 63-39378 and 63-130380, and Japanese Patent Applications 63-14754 and 1-140109.

It is preferable that the ratio by weight of the organic low-molecular-weight material to the matrix resin be in the range of about (2:1) to (1:16), more preferably in the range of (1:1) to (1:3) in the display layer of the card. When the ratio of the low-molecular-weight material to the matrix resin is within the above range, the matrix resin can form a film in which the organic low-molecular-weight material is uniformly dispersed in the form of finely-divided particles, and the obtained display layer can readily reach the maximum white opaque state.

In the display layer for use in the present invention, additives such as a surface-active agent and a high-boiling point solvent can be employed to facilitate the formation of a transparent image.

Examples of the high-boiling point solvent are tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethyl butyrate, methyl acetylricinoleate, butyl acetylricinoleate, butylphthalyl butyl glycolate and tributyl acetylcitrate.

Examples of the surface-active agent are polyhydric alcohol higher fatty acid esters; polyhydric alcohol higher alkyl ethers; lower olefin oxide adducts of polyhydric alcohol higher fatty acid ester, higher alcohol, higher alkylphenol, higher alkylamine of higher fatty acid, amides of higher fatty acid, fat and oil and polypropylene glycol; acetylene glycol; sodium, calcium, barium and magnesium salts of higher alkyl benzenesulfonic acid; calcium, barium and magnesium salts of higher fatty acid, aromatic carboxylic acid, higher aliphatic sulfonic acid, aromatic sulfonic acid, sulfuric monoester, phosphoric monoester and phosphoric diester; lower sulfated oil; long-chain polyalkyl acrylate; acrylic oligomer; long-chain polyalkyl methacrylate; long-chain alkyl methacrylate—amine-containing monomer copolymer; styrene—maleic anhydride copolymer; and olefin—maleic anhydride copolymer.

When the image obtained on the reversible thermosensitive recording material is used as a reflected image, the light reflection layer may be formed on the back side of the display layer. Thus, even if the display layer is made thin, the contrast of the image on the display layer can be improved. The light reflection layer can be formed by deposition of Al, Ni or Sn, as disclosed in Japanese Laid-Open Patent Application 64-14079.

A protective layer may be formed on the display layer comprising the reversible thermosensitive recording material. It is preferable that the protective layer have a thickness in the range of 0.1 $\mu$m to 5 $\mu$m. As the material for the protective layer, silicone rubber, silicone resin (described in Japanese Laid-Open Patent Application 63-221087), polysiloxane graft polymer (described in Japanese Patent Application 62-152550), ultraviolet-curing resin and electron radiation curing resin (described in Japanese Patent Application 63-310600) can be employed. In any case, the material for the protective layer is dissolved in a solvent to prepare a coating liquid and the thus prepared coating liquid is coated on the display layer. Therefore, it is desirable that the resin and the organic low-molecular-weight material for use in the thermosensitive recording material be not easily dissolved in such a solvent for use in the protective layer.

Examples of the above-mentioned solvent for preparation of the protective layer in which the resin and the organic low-molecular-weight material used in the display layer are not easily dissolved include n-hexane, methyl alcohol, ethyl alcohol and isopropyl alcohol. In particular, alcohol-based solvents are preferred from the viewpoint of the cost.

Further, as disclosed in Japanese Laid-Open Patent Application 1-133781, an intermediate layer can be interposed between the protective layer and the display layer to protect the display layer comprising the reversible thermosensitive recording material from the solvent or a monomer component for use in the coating liquid for the protective layer.

Examples of the resin for use in the formation of the intermediate layer include the resins used as the matrix resin for the thermosensitive recording material, and the following thermosetting resins and thermoplastic resins: polyethylene, polypropylene, polystyrene, polyvinyl alcohol, polyvinyl butyral, polyurethane, saturated polyester, unsaturated polyester, epoxy resin, phenolic resin, polycarbonate, and polyamide. It is preferable that the intermediate layer have a thickness of about 0.1 $\mu$m to 2 $\mu$m.

Other features of this invention will become apparent in the course of the following description of exemplary embodiments which are given for illustration of the invention and are not intended to be limiting thereof.

EXAMPLE 1

1. Preparation of Card

Formation of Magnetic Recording Layer

|  | Parts by Weight |
|---|---|
| $\gamma$-Fe$_2$O$_3$ | 1 |
| Vinyl chloride-vinyl acetate-vinyl alcohol copolymer (Trademark "VAGH", made by Union Carbide Japan K.K.) | 10 |
| Isocyanate (Trademark "Coronate L", made by Nippon Polyurethane Industry Co., Ltd.) (50% toluene solution) | 2 |
| Methyl ethyl ketone | 40 |
| Toluene | 40 |

A mixture of the above components was coated by a wire bar on a white polyethylene terephthalate (PET) film with a thickness of about 188 $\mu$m, serving as a support, and dried under application of heat, so that a magnetic recording layer with a thickness of about 10 $\mu$m was formed on the support.

Formation of Light Reflection Layer

Aluminum was vacuum-deposited on the above-prepared magnetic recording layer, so that a light reflection layer with a thickness of about 400 Å was formed on the magnetic recording layer.

Formation of Display Layer

The following components were mixed to prepare a coating liquid for a display layer comprising a reversible thermosensitive recording material:

|  | Parts by Weight |
|---|---|
| Behenic acid | 70 |
| Eicosanedioic acid | 30 |
| Diisodecyl phthalate | 2 |
| Vinyl chloride-vinyl acetate-phosphoric ester copolymer (Trademark "Denka Vinyl #1000P", made by Denki Kagaku Kogyo K.K.) | 25 |
| Tetrahydrofuran | 150 |
| Toluene | 15 |

The above prepared coating liquid for the display layer was coated on the above-prepared light reflection layer and dried under application of heat thereto, so that a display layer with a thickness of about 5 $\mu$m was formed on the light reflection layer. The thus obtained laminated material was prepared in the form of a card, whereby a card for use in the present invention was obtained.

2. Card Processing Test

Figure 2:
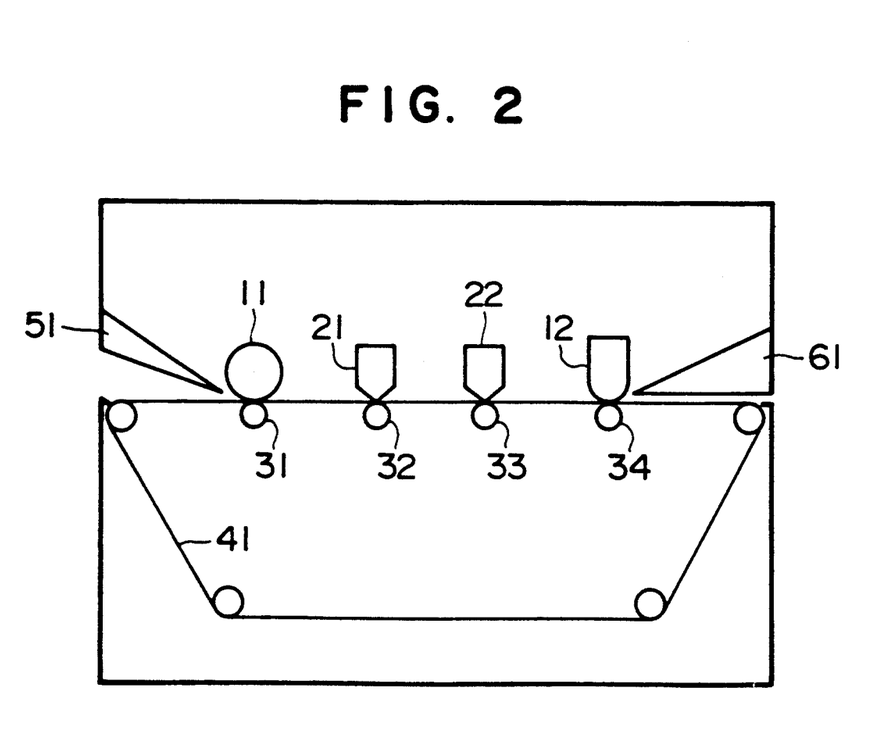
FIG. 2 is a schematic view showing one embodiment of a card processing apparatus in which the card processing method of the present invention is carried out.

A card processing test apparatus as shown in FIG. 2 was assembled in such a fashion that a heat roller 11 for erasing information from a display layer, a thermal head 21 for reading recorded information in a magnetic recording layer, a thermal head 22 for rewriting recorded information in a magnetic recording layer and a thermal head 12 for writing information in a display layer were situated along a conveyor belt 41, and the card processing test was conducted using the above obtained card.

In FIG. 2, reference numerals 31, 32, 33 and 34 indicate transporting rollers; reference numeral 51, a card inserting guide plate; and reference numeral 61, a card discharging guide plate.

First, the minimum time required to perform the step of writing information in the display layer by use of the thermal head 12 was measured. Although it was possible to perform the writing operation with a pulse width being controlled so as to be as short as possible, the pulse width was set to 1 ms and a line period was set to 2 ms. This is because minute holes were generated on the surface of the card when the pulse width was less than 1 ms. Since the number of lines was 160, the time required to perform the step of writing information in the display layer was about 0.3 sec.

In addition, the minimum time required to perform the step of erasing information from the display layer by use of the heat roller 11 was measured. The feed speed of the heat roller 11 was set to 120 mm/s because the erasing operation was not uniformly conducted when the feed speed exceeded 150 mm/s. A 60 mm-length portion of the card with the overall length of 85 mm was subjected to the erasing operation, so that the time required to perform the erasing operation in the display layer was about 0.5 sec.

The time required to carry out the step of reading recorded information in the magnetic recording layer and to carry out the step of rewriting the recorded information in the magnetic recording layer were both controlled to 0.1 sec.

(a) Error Occurring Ratio in Reading Step in Magnetic Recording Layer

With the thermal head 12 for writing information in the display layer taken out of the apparatus, the heat roller 11 for erasing information in the display layer, the thermal head 21 for reading information in the magnetic recording layer and the thermal head 22 for writing information in the magnetic recording layer were arranged along the conveyor belt 41 in such an order as shown in FIG. 2. The card inserted in the apparatus was first heated by the heat roller 11, and then the recorded information in the magnetic recording layer was read by use of the thermal head 21 which was located just after the heat roller 11. The recorded information in the magnetic recording layer was read 1000 times and the error occurring ratio was calculated. The error occurring ratio in reading operation was as low as 0.1% when compared with that of 2% in the case where the card was not heated by the heat roller 11 just before the reading step in the magnetic recording layer. Thus, the reliability of reading operation in the magnetic recording layer was increased.

Then, to obtain the error occurring ratio in the case where the information rewritten in the magnetic recording layer was read by the thermal head 21, the heat roller 11 for erasing information in the display layer, the thermal head 22 for writing information in the magnetic recording layer and the thermal head 21 for reading information in the magnetic recording layer were arranged along the conveyor belt 41 in this order. In this case, the error occurring ratio in reading operation was also as low as 0.3% when compared with that of 2% in the case where the card was not heated prior to the rewriting operation.

(b) Time Required to Process the Card

Using the card processing test apparatus as shown in FIG. 2, the time required to process the card was measured. In this apparatus, the step of erasing recorded information from the display layer, the step of reading recorded information in the magnetic recording layer, the step of rewriting the recorded information in the magnetic recording layer and the step of writing information in the display layer proceeded in that order, namely, in the order of (c)–(a)–(b)–(d).

The time required to carry out each of the above-mention steps was as follows:

step (a): about 0.1 sec
step (b): about 0.1 sec
step (c): about 0.5 sec
step (d): about 0.3 sec It took about 0.1 sec to feed the card from one step to another. In addition, it took about 0.5 sec for information processing between the steps (a) and (b), and between the steps (a) and (d). Each time required was set in Examples and Comparative Example similarly.

The heat roller 11 for erasing information from the display layer and the thermal head 12 for writing the recorded information in the display layer were situated nearest to the card inserting guide plate 51 and the card discharging guide plate 61, respectively, and part of the card was out of the apparatus in the course of the erasing operation and writing operation in the display layer.

As a result, the overall time required to process the card was about 1.7 sec. The card was completely hidden in the card processing apparatus only in the step of reading recorded information and the step of rewriting the recorded information in the magnetic recording layer. Therefore, the time when the card was completely inside the apparatus was curtailed to about 0.9 sec.

EXAMPLE 2

Using the same card as obtained in Example 1, the overall time required to process the card was measured in the same manner as in Example 1 except that the order of steps was changed to (c)–(a)–(d)–(b) by changing the layout in the card processing apparatus.

In this layout, a cooling means was provided just after the thermal head 12 for writing information in the display layer so that the heat applied to the card in the course of the step (d) might not influence the operation of writing information in the magnetic recording layer at the step (b).

In this case, the overall time required to process the card was about 1.7 sec, which was the same as in Example 1. The time when the card was completely inside the apparatus was curtailed to about 1.2 sec.

EXAMPLE 3

Using the same card as obtained in Example 1, the overall time required to process the card was measured in the same manner as in Example 1 except that the order of steps was changed to (a)–(c)–(b)–(d) by changing the layout in the card processing apparatus.

In this case, the overall time required to process the card was further decreased to about 1.2 sec, because the information processing was conducted while the step (c) of erasing information from the display layer was carried out. The time when the card was completely inside the apparatus was curtailed to about 0.9 sec.

EXAMPLE 4

Using the same card as obtained in Example 1, the overall time required to process the card was measured in the same manner as in Example 1 except that the order of steps was changed to (a)-(c)-(d)-(b) by changing the layout in the card processing apparatus.

In this case, the overall time required to process the card was about 1.2 sec, which was the same as in Example 3. The time when the card was completely inside the apparatus was also about 1.2 sec.

COMPARATIVE EXAMPLE 1

Using the same card as obtained in Example 1, the overall time required to process the card was measured in the same manner as in Example 1 except that the order of steps was changed to (a)-(b)-(c)-(d) by changing the layout in the card processing apparatus.

In this case, the overall time required to process the card was about 1.7 sec. The time when the card was completely inside the apparatus was also about 1.7 sec.

As previously explained, the processing speed of a card which has a magnetic recording portion and a rewritable-type display portion comprising a reversible thermosensitive recording material can be improved according to the card processing method of the present invention.

What is claimed is:

1. A card processing method of recording information or displaying, rewriting or erasing recorded information in a card formed of a resin comprising (i) a magnetic recording portion capable of recording information therein, rewriting recorded information, or reading recorded information therefrom, and (ii) a rewritable display portion comprising a reversible thermosensitive recording material, capable of recording information in a visible manner to display recorded information and erasing recorded information therefrom, in which the steps (a) reading recorded information in said magnetic recording portion, (b) rewriting the recorded information in said magnetic recording portion, (c) erasing recorded information from said rewritable display portion by heating the rewritable display portion of the card, and (d) writing information in said rewritable display portion can be carried out, wherein said step (c) is carried out first, and said step (a) is carried out before said step (b) and said step (d) are carried out, whereby said step (a) is performed while the resin of the card is softened by the heating of step (c) to improve readability of the magnetic recording portion.

2. A card processing method of recording information or displaying, rewriting or erasing recorded information in a card formed of a resin comprising (i) a magnetic recording portion capable of recording information therein, rewriting recorded information, or reading recorded information therefrom, and (ii) a rewritable display portion comprising a reversible thermosensitive recording material, capable of recording information in a visible manner to display recorded information and erasing recorded information therefrom, comprising the steps of:

(a) reading recorded information in said magnetic recording portion;

(b) rewriting the recorded information in said magnetic recording portion;

(c) erasing recorded information from said rewritable display portion by heating the rewritable display portion of the card; and (d) writing information in said rewritable display portion;

wherein said steps are executed such that step (c) is started first and step (a) is started second, whereby said step (a) is performed while the resin of the card is softened by the heating of step (c) to improve magnetic readibility of the magnetic recording portion.

3. The card processing method according to claim 2, wherein said step (b) is started third.

4. The card processing method according to claim 2, wherein said step (d) is started third.

* * * * *

UNITED STATES PATENT AND TRADEMARK OFFICE
CERTIFICATE OF CORRECTION

PATENT NO. : 5,321,239
DATED : June 14, 1994
INVENTOR(S) : Fumihito MASUBUCHI et al.

It is certified that error appears in the above-indentified patent and that said Letters Patent is hereby corrected as shown below:

Column 1, line 42, after "image" insert --,--.

Column 4, line 31, change "portion, In" to --portion. In--.

Column 5, line 21, change "ma" to --may--.

Column 9, line 48, before "organic" insert --group consisting of oxygen, nitrogen, sulfur and halogen in its molecule. More specifically, it is preferable the--.

Column 12, line 21, change "1" to --10--.

Signed and Sealed this

Thirteenth Day of June, 1995

Attest:

BRUCE LEHMAN

Attesting Officer

Commissioner of Patents and Trademarks